April 23, 1963     H. A. PRELLER     3,086,412

PALLET STONE SETTING TOOL

Filed Aug. 7, 1961

HUGH A. PRELLER
INVENTOR.

BY
*Robert K. Rhea*
AGENT

United States Patent Office 3,086,412
Patented Apr. 23, 1963

3,086,412
PALLET STONE SETTING TOOL
Hugh A. Preller, 321 N. Robinson, Oklahoma City, Okla.
Filed Aug. 7, 1961, Ser. No. 129,823
5 Claims. (Cl. 81—7)

The present invention relates to watch repairing and more particularly to a pallet stone setting tool.

Watches are provided with a pallet fork which is relatively small, ranging in size from approximately ³⁄₃₂ to ¼ inch in length. The pallet fork is substantially T-shaped in general configuration and the ends of the fork are each provided with a jewel or stone which is glued in place. The purpose of the pallet fork and attached stones is to regulate the rotation of an escapement wheel. It is frequently necessary to replace one or both of these stones and due to their relatively small size it is difficult to properly position these stones manually so that they properly engage and release the teeth on the escapement wheel. This is principally accomplished through a trial and error method which is a time consuming operation in that after positioning each stone the pallet fork must be installed in place to test the setting of each stone.

The prior art discloses a number of pallet stone setting devices but each of these devices are formed of component parts all arranged on a horizontal plane to hold and position the pallet fork.

It is, therefore, the principal object of the instant invention to provide a pallet stone setting tool wherein the component parts are arranged on a base to operate in more than one plane.

A similar important object is to provide a device whereby a jeweler may replace one or both stones on a pallet fork thereby eliminating the expense of a new stone equipped pallet fork and thus repair a watch at less cost to the customer.

Another important object is to provide a device of this class which will securely hold the pallet fork and wherein adjustable gages contact and accurately position each stone on the ends of the pallet fork.

Another object is to provide a device of this class which will accurately position and hold a pallet fork of any size for positioning the stones thereon and wherein the stone may be cemented in place while the pallet fork is held in position.

Still another object is to provide a device of this class wherein gage means, forming a part of the device, may be manually moved toward and away from the respective ends of the pallet fork to insure accurate positioning of the stones.

Still another object is to provide a device of this class which is sturdily constructed and wherein all parts are connected to a single base member.

The present invention accomplishes these and other objects by providing a base and means, secured to the base, for engaging and holding the pivot shaft and shank portion of a pallet fork. A pair of pivoting gages are slidably mounted with respect to the base for movement toward and away from the ends of the pallet fork.

Other objects will be apparent from the following description when taken in conjunction with the accompanying single sheet of drawings, wherein.

Like characters of reference designate like parts in those figures of the drawings in which they occur.

In the drawings.

Figure 1:
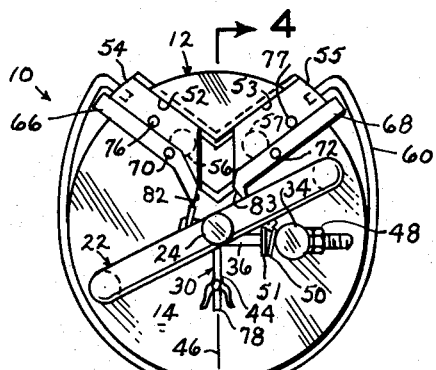
FIGURE 1 is a top plan view of the device, to an enlarged scale.

The reference numeral 10 indicates the device, as a whole, which is cylindrical in general configuration. The numeral 12 indicates a base having upper and lower parallel surfaces 14 and 16, respectively. The base is centrally drilled, as at 18, and provided with a spring actuated plate 20 for the purposes which will presently be apparent.

Figure 6:
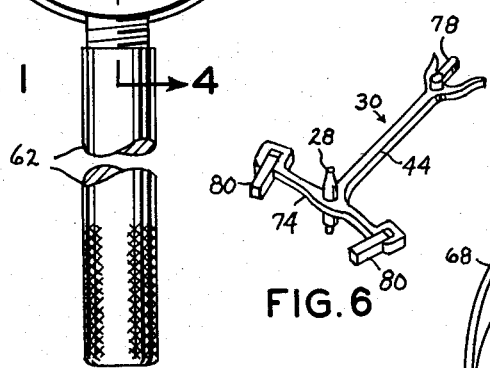
Figure 3:
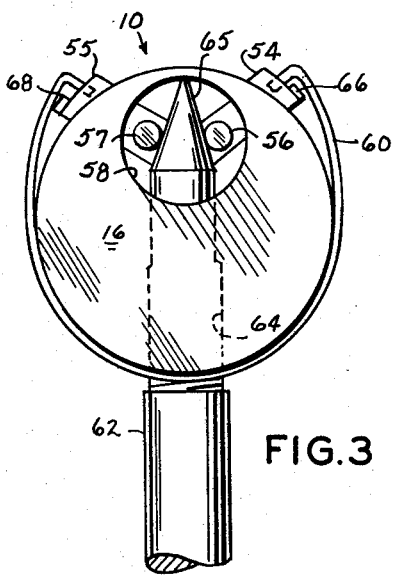
FIGURE 3 is a bottom view of the device, to an enlarged scale.

An inverted U-shaped yoke 22 is mounted on the upper surface 14 of the base and extends diametrically thereacross. A mandrel 24 is threadedly engaged with the yoke in vertical alignment with the central bore 18. The depending end portion of the mandrel is centrally drilled and similarly provided with a spring-loaded plate 26 for receiving one end of the pivot pin 28 of a pallet fork 30 (FIG. 6). The other end portion of the pin 28 is received within the bore 18 within the base whereby movement of the mandrel 24, toward the base, secures the pivoting pin 28 perpendicular with respect to the base surface 14.

A centrally bored post 32 is mounted on the upper surface of the base and is provided with a pin 34 which is threadedly engaged within the upper end portion of the post 32. An arm 36 extends transversely through the post through a suitable slot 37 therein. A spring 38, within the post 32, continuously urges the arm 36 upwardly against a spacer 39 which in turn contacts the pin 34. The arm 36 projects inwardly of the base from the post 32 and has its free end portion turned arcuately downwardly and bifurcated to form an inverted V-shaped recess 42 for co-operatively contacting opposing upper side surfaces and positioning the shank or stem 44 of the pallet fork 30 in longitudinal alignment with a center line 46 inscribed on the base surface 14. Thus it may be seen that manually screwing the pin 34 into or out of the post 32 lowers and raises the arm 36 to grip or release the stem 44. The arm 36 may be adjustably positioned, transversely of the post 32, by nuts 48 threadedly engaged with the end portion of the arm opposite the inverted V-shaped end 42. This lateral adjustment of the fork is for the purpose of aligning the apex of the inverted V-shaped end 42 with the center line 46 inscribed on the base surface 14. A spring 50, surrounding the arm 36 and interposed between the post 32 and a washer 51 connected to the arm, normally urges the arm end 42 away from the post 32.

Figure 4:
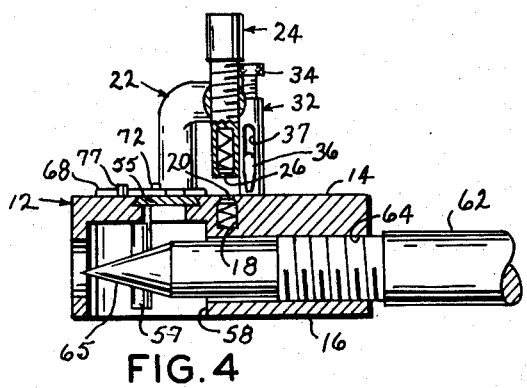
FIGURE 4 is a vertical cross-sectional view taken substantially along the line 4—4 of FIG. 1.
Figure 5:
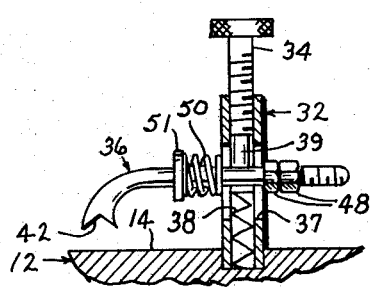
FIGURE 5 is a vertical cross-sectional view, to a further enlarged scale, taken substantially along the line 5—5 of FIG. 2; and, FIGURE 6 is a perspective view of a pallet fork, per se, to a further enlarged scale, showing the relative positions of stones positioned on the ends of the fork.

A pair of dove-tail grooves 52 and 53 are formed in the upper surface 14 of the base and extend outwardly in diverging relation to the periphery of the base from a point, adjacent the vertical center of the base aligned with the scribed line 46. The selected angular position of the grooves renders the device useful in properly positioning pallet fork stones on a wide range of sizes of pallet forks. A pair of guides 54 and 55 are slidably mounted in the respective grooves 52 and 53. The upper surfaces of the guides 54 and 55 coincide with the plane of the base surface 14 as shown by the guide 55 (FIG. 4). The guides are provided with pins 56 and 57, connected to the respective lower surfaces thereof in depending relation. The pins 56 and 57 extend downwardly into a vertical opening 58 formed in the lower surface 16 of the base. Spring means 60, connected with the respective ends of the guides 54 and 55, is extended around the periphery of the base 12 opposite the guides 54-55 and normally urges the latter inwardly of the periphery of the base.

An adjusting screw or shaft 62 is threadedly carried by a horizontal bore 64, formed in the base 12. The shaft 62 is longitudinally aligned with the inscribed center line 46. The inwardly disposed end portion of the shaft 62 is provided with a conical shaped end portion 65 positioned between the depending guide pins 56 and 57. Thus, manually screwing the shaft 62 into or out of the base 12 moves the pins 56 and 57 and respective guides 54 and 55 inwardly or outwardly of the base. Elongated gages 66 and 68 are pivotally mounted intermediate their ends by pins 70 and 72 on the upper surface of the guides 54 and 55, respectively. Each of the gages are rectangular in cross section and has its free outwardly disposed end portion projecting outwardly beyond the respective outer end of the respective guide while the opposite end portion of the gage is turned inwardly toward the respective ends of the fork 74 of the pallet fork 30.

Upstanding stops 76 and 77, connected to the upper surface of the respective guides 54 and 55 outwardly of the pivot pins 70 and 72, respectively, are positioned to limit movement of the respective gages 66 and 68, in one direction, for the purposes which will presently be apparent.

*Operation*

Figure 2:
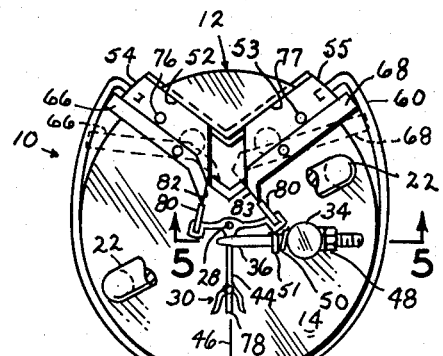
FIGURE 2 is a view similar to FIG. 1 with one of the clamps broken away for clarity.

In operation the pallet fork 30 is placed upon the base surface 14 with the guide pin 78 of the horn end of the stem disposed upwardly. The stem 44 is substantially aligned with the scribed line 46 and the downwardly disposed end of the pivot shaft 28 is positioned against the plate 20 in the recess 18. The mandrel 24 is manually screwed downwardly so that the plate, 26, in its depending end, egages the upwardly disposed end of the pallet fork pivot 28. The screw 34 is moved downwardly to force the fork end 42 of the arm 36 into engagement with the stem 44, thus the mandrel 24 and arm 36 secures the pallet fork 30 in position on the base surface 14 with the downwardly disposed surfaces of the pallet fork contiguously contacting the surface 14. Pallet fork stones 80 are then positioned within the respective stone receiving ends of the pallet fork 74. The depth that the stones 80 penetrate or enter the respective stone receiving ends or sockets of the pallet fork 74 is one critical measurement for accurate placement of the stones. The gages 66 and 68 are manually moved, and held by the thumb and forefinger of one hand of an operator, so that they contact their respective stop. The shaft 62 is then manually rotated, by the other hand of the operator, so that the guides 54 and 55 move inwardly of the base 12 until the inwardly directed pointed ends of the gages 66 and 68 contact and gently slide across the free end surface or face of the respective pallet fork stone, opposite the end portion disposed within the respective socket of the pallet fork 74, to the longitudinal center of the stones. At this point of the operation the gages 66 and 68 must be checked to insure that the gages are positioned against their respective stop. When each stone is positioned in the respective pallet fork socket so that the tip end of the respective gage centrally contacts the free end surface of the respective stone (FIG. 2) the stone depth is correct. The gages 66 and 68 each have an end surface 82 and 83, respectively, forming reference planes which, when aligned with the respective longitudinal center line of the respective stone, properly positions the latter within the pallet fork ends. The gage end surfaces 82 and 83 when aligned with the longitudinal center line of the stones insures that the angular position of the stones with respect to the sockets in the pallet fork is accurate. The angular position and inwardly convergent direction of movement of the guides 54 and 55 with respect to the scribed center line 46 permits alignment of the end surfaces 82 and 83 of the respective gages 66 and 68 with the longitudinal center line of pallet stones of a comparatively wide range of sizes of pallet forks. A small amount of shellac, not shown, is placed upon the connecting end of each stone and its pallet fork socket. The device 10 is then positioned over a flame or burner, not shown, for heating the base and melting the shellac to secure the respective stones in place. The pallet fork 30 is then removed from the base by loosening the screw 34 and mandrel 24.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A pallet stone setting tool, comprising: a base, said base having a pair of grooves formed in its upper surface extending outwardly from its central portion in diverging relation; a guide slidably mounted in each of said grooves; spring means normally urging said guides inwardly of the periphery of said base, said base having a central recess; a mandrel adjustably mounted vertically on said base adapted to serve as a pivot for one end of a pallet fork pivot shaft in cooperation with the recess in said base; a vertically adjustable clamp mounted on said base, said clamp having an arm adapted to engage the stem portion of a pallet fork intermediate its ends when the latter is positioned on said base; a gage pivotally mounted on each of said guides and having an end portion adapted to contact and position a pallet stone on the respective adjacent end of a pallet fork when mounted on said base, said gage having an edge surface forming a pallet stone longitudinal center line reference plane; a stop on each of said guides for limiting the pivoting movement of each said gage with respect to said guides and toward the respective ends of a pallet fork when the latter is mounted on said base; and a shaft means threadedly engaged within said base and slidably contacting each of said guides for moving the latter and positioning the respective ends of said gages into contact with a pallet stone positioned on the respective end of a pallet fork.

2. A pallet stone setting tool, comprising: a circular base, said base having a pair of co-operating substantially radial grooves formed in its upper surface; a guide slidable within each of said grooves; spring means normally urging said guides inwardly of the periphery of said base, said base having a central bore; a spring urged plate within and normally closing the bore in said base; an inverted U-shaped yoke mounted on the upper surface of said base; a mandrel adjustably mounted vertically on said U-shaped yoke, said mandrel adapted to serve as a pivot for one end of a pallet fork pivot shaft in co-operation with the bore in said base; a vertically adjustable clamp mounted on said base, said clamp having an arm adapted to engage the stem portion of a pallet fork intermediate its ends; a gage pivotally mounted on each of said guides and having a pointed end portion adapted to contact and position a pallet stone on the respective adjacent end of a pallet fork, said gage having an edge surface forming a pallet stone longitudinal center line reference plane; a stop on each of said guides for limiting the movement of each said gage with respect to said guides and toward the respective ends of a pallet fork when the latter is mounted on said base; and a shaft means threadedly engaged within said base and slidably contacting each of said guides for moving the latter and positioning the respective pointed end portion of said gages in contact with the free end surface of a pallet stone positioned on the respective end of a pallet fork.

3. A pallet stone setting tool, including: a base, said base having a central bore; mandrel means mounted on said base in co-operative relation with respect to the central bore in said base for gripping opposing end portions of a pallet fork pivot shaft; means mounted on said base for gripping the stem of a pallet fork; gage means slidably and pivotally mounted on said base for movement toward and away from the respective stone carrying ends of a pallet fork and positioning a stone thereon, said means having edge surfaces forming pallet stone longitudinal center line reference planes; spring means normally urging said gage means toward a pallet fork mounted on said base; and a shaft means threadedly carried by said base and engageable with said gage means for adjustably positioning the latter.

4. A pallet stone setting tool, comprising: a base, said base having a central bore; a mandrel mounted above said base and vertically aligned with the central bore in said base and perpendicular with respect to the upper surface of said base for engaging, in co-operation with the central bore, the opposing end portions of a pivot pin of a pallet fork; arm means adjustably mounted on said base for holding the stem portion of a pallet fork; gages slidably and pivotally mounted on said base and movable toward and away from the respective stone carrying ends of a pallet fork, said gages each having an end portion disposed toward said pallet fork for engaging and positioning pallet stones, said gages having an end surface forming a pallet stone longitudinal center line reference plane; and means connected with said base for moving the gages toward and away from the stone carrying ends of a pallet fork.

5. A pallet stone setting tool, including: a base; means mounted on said base for pivotally mounting opposing end portions of a pallet fork pivot shaft; means mounted on said base for gripping the stem of a pallet fork; gage means slidably and pivotally mounted on said base for movement toward and away from the respective stone carrying ends of a pallet fork and positioning a stone thereon, said gage means having edge surfaces forming pallet stone longitudinal center line reference planes; and means connected with said base and engageable with said gage means for adjustably positioning the latter.

References Cited in the file of this patent
UNITED STATES PATENTS

| | | |
|---|---|---|
| 817,955 | Brosius | Apr. 17, 1906 |
| 865,925 | Miller | Sept. 10, 1907 |
| 2,181,971 | Gaston | Dec. 5, 1939 |
| 2,564,650 | Sinkler et al. | Aug. 14, 1951 |